June 10, 1924.
A. J. LONG
BELT CLAMP
Filed Feb. 24, 1922
1,497,662
2 Sheets-Sheet 1
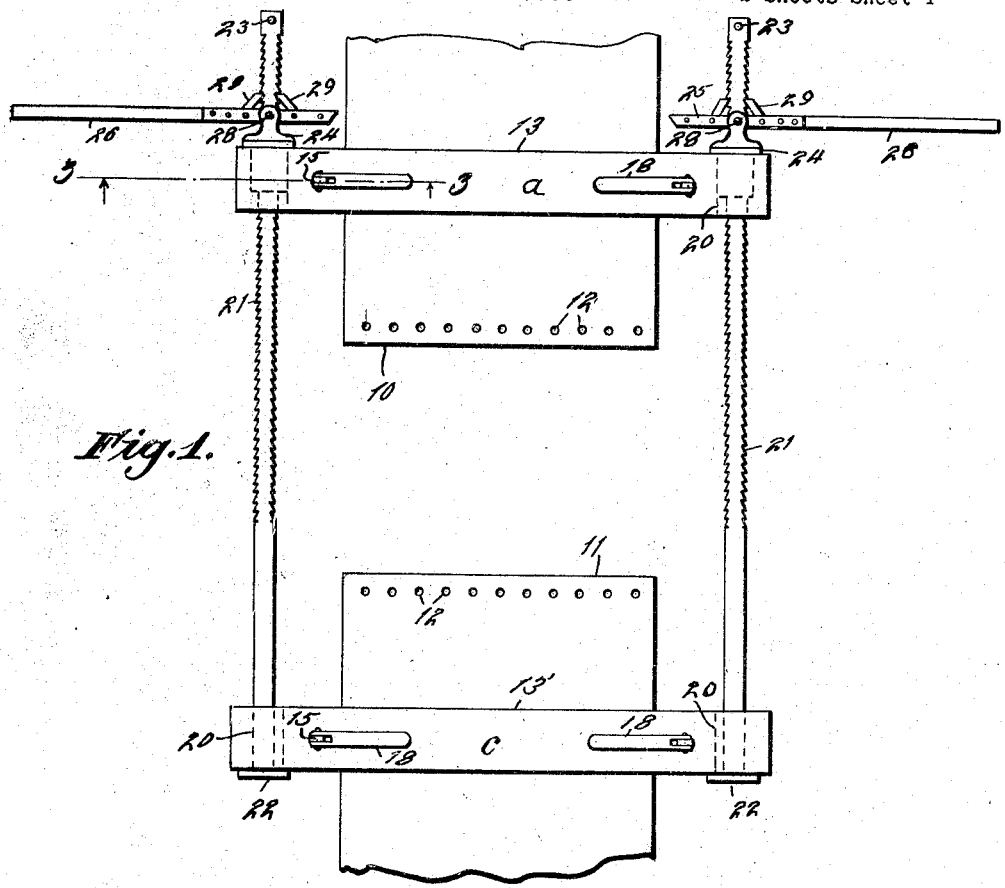
Fig.1.
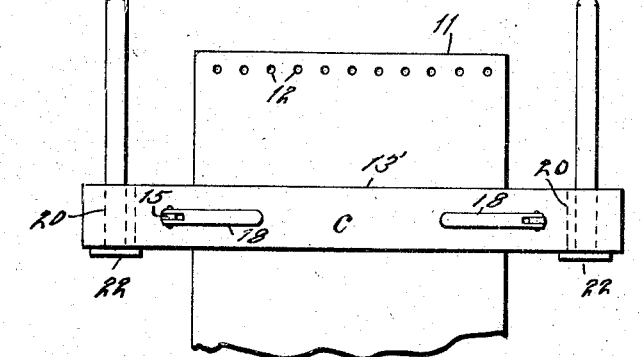
Fig.2.
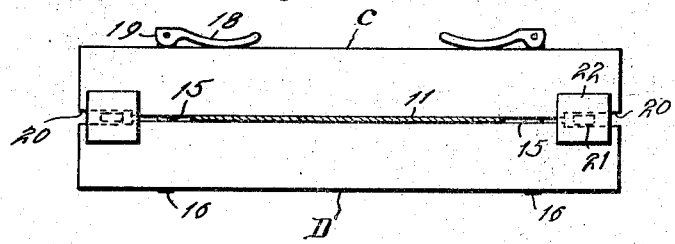
Inventor
Andrew J. Long
By
Attorney June 10, 1924.

A. J. LONG

BELT CLAMP

Filed Feb. 24, 1922

Inventor
Andrew J. Long

By
Attorney

Patented June 10, 1924.

1,497,662

UNITED STATES PATENT OFFICE.

ANDREW J. LONG, OF BALLINGER, TEXAS.

BELT CLAMP.

Application filed February 24, 1922. Serial No. 539,017.

*To all whom it may concern:*

Be it known that I, ANDREW J. LONG, citizen of the United States, residing at Ballinger, in the county of Runnels and State of Texas, have invented certain new and useful Improvements in Belt Clamps, of which the following is a specification.

This invention has reference to a belt-clamp for drawing the ends of a machine belt together to permit their being laced or otherwise secured.

An object of the invention is to provide means for tightening the belt while in position by drawing together the unsecured ends and holding such ends in proximity to each other until laced or otherwise fastened.

A further object is to provide a belt-contracting and clamping device which is operated by hand and which has an adjustment adapting it to belts of varying lengths.

Various other objects and advantages of the invention will become apparent as the description proceeds.

In the drawings—

Figure 1 is a plan view of the belt clamp as applied to adjacent belt ends.

Figure 2 is a side view of one of the clamp members of the device.

Figure 3:
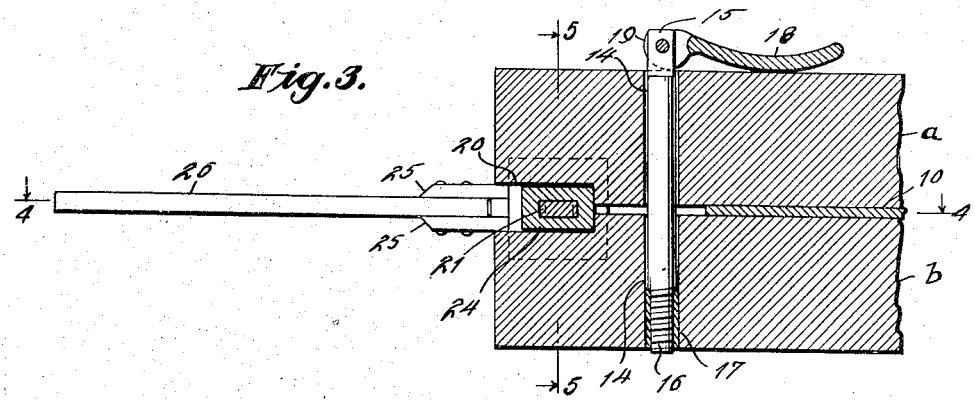
Figure 3 is a vertical, longitudinal section taken on line 3—3 of Figure 1.
Figure 4:
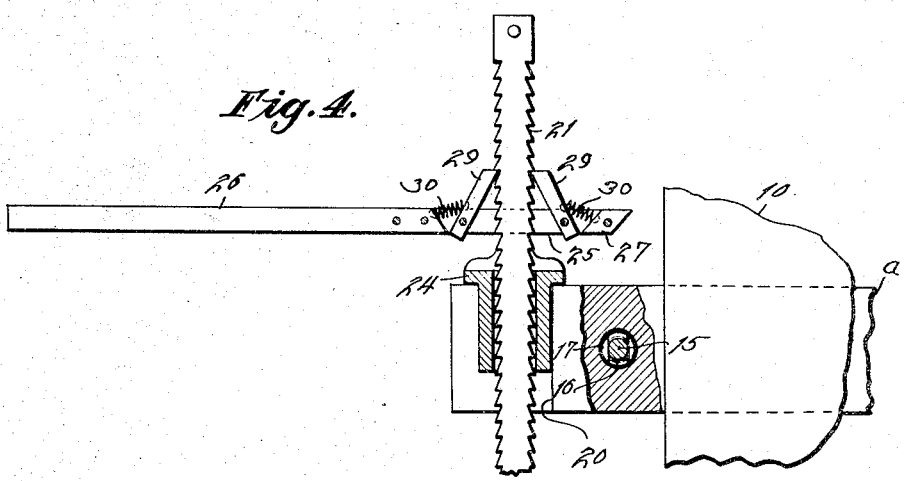
Figure 4 is a section taken on line 4—4 of Figure 3.
Figure 5:
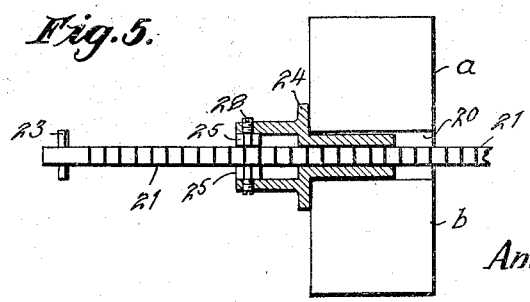
Figure 5 is a transverse sectional view taken on line 5—5 of Figure 3.

In the drawings 10 and 11 indicate the adjacent ends of a machine belt having the usual thong holes 12 for lacing purposes. The present invention provides means for drawing these ends close together to facilitate the lacing or joining operation, and comprises a pair of belt grips 13 and 13' which are respectively clamped to the belt near each end.

The belt grips embody a pair of blocks, $a$ and $b$ and $c$ and $d$ respectively between which the belt is clamped as shown in Figure 2. Aligned openings 14 are provided in the blocks at each end and receive long bolts 15 having screw ends 16 for engaging threaded taps 17 which have a forced fit in opening 14 of blocks $b$ and $d$. Handles 18 are pivoted to the upper ends of the bolts and provide convenient means for turning the screws in the taps either to separate or draw together bars of each grip. Each handle has a cam-head 19 which binds the handle against block $a$ when pushed down thereagainst as in Figure 3 so as to lock screw 16 against turning.

The belt grips have notches 20 at each end to permit the insertion therethru of ratchet bars 21, of which there are two. Each ratchet bar has a head 22 at one end and a stop pin 23 at its other end. The notches of bars $a$ and $c$ also provide seats for the hangers 24 of the ratchet levers.

Each lever consists of spaced parallel rocker-strips 25 having a handle 26 attached thereto at one end and a spacer block 27 at the other end. Rockers 25 are fulcrumed on hanger 24, as at 28, and carry pivoted dogs 29 which engage in notches an opposite side of ratchet bar 21. Springs 30 are provided to press the dogs into the notches and by working the lever back and forth or up and down the dogs will move along the ratchet bar, in a step by step movement, causing clamp 13 and 13', hence belt ends 10 and 11 to be drawn together.

Ratchet bars 21 provide the guides along which grips member 13 is movable and the head 22 at one end of a guide and the pin 27 at the other end prevents the grips from dropping off the guides while in use.

From the foregoing it is believed that the advantages and novel features of the invention can be readily understood and further detailed description is deemed unnecessary.

What is claimed is:

A device of the character described comprising relatively spaced belt clamps made in sections presenting aligned notches open to the respective ends thereof, ratchet guides extending through said notches and on which said clamps are movable, means at one end of each of said guides to limit movement of one of said clamps in one direction on said guides, hangers loosely mounted on said guides adjacent their other end and having means to seat in the notches of the other said clamps, said hangers being positioned between said last named clamps and the projecting end of said guides, a lever pivotally mounted on each of hangers, dogs mounted on said levers, means to yieldingly force said dogs into engagement with the ratchet teeth of said guides whereby when said levers are rocked on said hangers said dogs will cause one of said clamps to move toward the other in a step by step movement, and said guides and said hangers being removable from said clamps, laterally without disengaging the respective clamp sections.

In testimony whereof I affix my signature.

ANDREW J. LONG.